United States Patent
Rassaian

(10) Patent No.: US 6,813,749 B2
(45) Date of Patent: Nov. 2, 2004

(54) METHOD, SYSTEM AND COMPUTER PROGRAM PRODUCT FOR MULTIDISCIPLINARY DESIGN ANALYSIS OF STRUCTURAL COMPONENTS

(75) Inventor: Mostafa Rassaian, Bellevue, WA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 10/074,914

(22) Filed: Feb. 12, 2002

(65) Prior Publication Data

US 2003/0154451 A1 Aug. 14, 2003

(51) Int. Cl.[7] .................................................. G06F 17/50
(52) U.S. Cl. .................................... 716/4; 716/5; 716/6
(58) Field of Search .......................... 716/4–6; 703/1, 703/7; 702/15, 34, 56, 130, 182; 73/764, 786, 80, 2, 804

(56) References Cited

U.S. PATENT DOCUMENTS

| 4,480,480 A | * | 11/1984 | Scott et al. | ................... 73/769 |
| 4,858,146 A | * | 8/1989 | Shebini | ......................... 703/1 |
| 5,684,713 A | * | 11/1997 | Asada et al. | .................. 716/19 |
| 6,212,486 B1 | * | 4/2001 | Huang et al. | .................. 703/7 |
| 6,295,513 B1 | * | 9/2001 | Thackston | ...................... 703/1 |
| 6,301,970 B1 | * | 10/2001 | Biggs et al. | .................. 73/804 |

* cited by examiner

Primary Examiner—Vuthe Siek
Assistant Examiner—Naum Levin
(74) Attorney, Agent, or Firm—Alston & Bird LLP

(57) ABSTRACT

The method, system and computer program product for design analysis of a component efficiently subject a finite element model of the component to the appropriate thermo-mechanical environment(s), evaluate the component's stress responses to the environmental loads, and compare the stress responses to pre-selected limits. In addition, the method, system and computer program product accurately identify potential failure points of the component and the interconnect structure of the component, identify the type of environmental load that caused the failure, prompt the user to modify the design or other user-defined parameter of the component, and further test a finite model of the modified component. Thus, the method, system and computer program product provide an economical and timely design analysis for components that enables users to determine the appropriate design for the components based upon the type of thermo-mechanical environment(s) to which the component will be subjected over its lifetime.

66 Claims, 13 Drawing Sheets

| Durability Module | Description | Configuration |
|---|---|---|
| CCC | Leadless chip component | 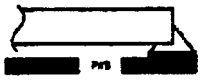 |
| DIO | Planar-diode package |  |
| IND | Inductor feedthrough foil | 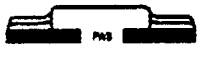 |
| Hybrid-GW | Gull wing |  |
| Hybrid-SGW | Spider gull wing | 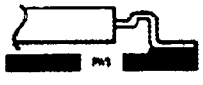 |
| L-lead | L-leaded component | 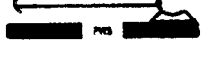 |
| J-lead | J-leaded component | 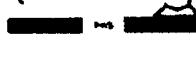 |
| PTH | Plated-through-hole component |  |
| PBGA | Plastic ball grid arrays | 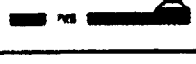 |
FIG. 4

Durability Part Number Table

| Part Number | Package Name | Lead Style Name | Lead Material Name |
|---|---|---|---|
| 172908-00K | 313_BGA_Package_100milpitch | HYBRID_002K | CU |
| 173332-00P | TII-TSOP-54_10x22mm | HYBRID_024 | CU |
| 173334-11J | pqfp_208_1e | | |
| 173370-00L | 360_CBGA_Package | | |
| 173446-00K | 388_BGA_Package | | |
| 280-10020-101 | 280-10020-101 | | |
| 280-10025-101 | 280-10025-101 | | |
| 280-10025-102 | 280-10025-102 | | |
| 280-10025-103 | 280-10025-103 | | |
| 280-10025-104 | 280-10025-104 | | |

Durability Part Number Table

| Package Name | Substrate Length | Substrate Width | Balls | Thrm Balls X | Thrm Balls Y |
|---|---|---|---|---|---|
| 144_BGA_Package | 0.512 | 0.512 | 144 | 0 | 0 |
| 144_BGA_Package_ana | 0.512 | 0.512 | 144 | 0 | 1 |
| 313_BGA_Package_100milpitch | 1.380 | 1.380 | 169 | 0 | 0 |
| 313_BGA_Package_50milpitch | 1.380 | 1.380 | 625 | 6 | 6 |
| 324_BGA_Package | 0.906 | 0.906 | 324 | 0 | 0 |
| 352_BGA_Package | 1.378 | 1.378 | 352 | 0 | 0 |
| 360_CBGA_Package | 0.980 | 0.980 | 361 | 0 | 0 |
| 388_BGA_Package | 1.378 | 1.378 | 388 | 6 | 6 |
| Dummy_BGA_Package | 0.512 | 0.512 | 144 | 0 | 0 |
| ird_pbga_225f_025 | 1.180 | 1.180 | 225 | 12 | 12 |

[New] [Copy] [Delete]
[OK] [Reset] [Cancel]

FIG. 5

Durability Part Number Table

| Part Number | Package Name | Lead Style Name | Lead Material Name |
|---|---|---|---|
| 172908-00K | 313_BGA_Package_100milpitch | HYBRID_002K | CU |
| 173332-00P | T11-TSOP-54_10X22mm | HYBRID_024 | CU |
| 173334-11J | pqfp_208_1e | | |
| 173370-00L | 360_CBGA_Package | | |
| 173446-00K | 388_BGA_Package | | |
| 280-10020-101 | 280-10020-101 | | |
| 280-10025-101 | 280-10025-101 | | |
| 280-10025-102 | 280-10025-102 | | |
| 280-10025-103 | 280-10025-103 | | |
| 280-10025-104 | 280-10025-104 | | |

Durability Part Number Table

| Lead Style Name | S1 | S2 | S3 | RHO | R1 | R2 | E | H1 | D | S1 |
|---|---|---|---|---|---|---|---|---|---|---|
| 900-11695-fig1 | 0.000 | 0.000 | 0.000 | 0.000 | 0.000 | 0.000 | 0.000 | 0.000 | 0.000 | 0.000 |
| HYBRID_001 | 0.005 | -0.030 | 0.000 | 0.000 | 0.750 | 0.013 | 0.000 | 0.047 | 0.014 | 0.015 |
| HYBRID_002 | 0.020 | 0.080 | 0.080 | 0.000 | 0.005 | 0.650 | 0.008 | 0.008 | 0.050 | 0.010 |
| HYBRID_002A | 0.025 | 0.030 | -0.035 | 0.000 | 0.005 | 0.005 | 0.105 | 0.105 | 0.026 | 0.007 |
| HYBRID_002b | 0.010 | 0.030 | 0.055 | 0.000 | 0.005 | 0.005 | 0.000 | 0.057 | 0.007 | 0.010 |
| HYBRID_002c | 0.000 | 0.030 | 0.056 | 0.000 | 0.005 | 0.005 | 0.000 | 0.035 | 0.006 | 0.006 |
| HYBRID_002d | 0.000 | 0.006 | 0.021 | 0.000 | 0.001 | 0.001 | 0.000 | 0.040 | 0.018 | 0.004 |
| HYBRID_002e | 0.016 | 0.006 | 0.021 | 0.000 | 0.005 | 0.005 | 0.000 | 0.050 | 0.017 | 0.011 |
| HYBRID_002f | 0.037 | 0.013 | 0.051 | 0.000 | 0.006 | 0.006 | 0.000 | 0.072 | 0.009 | 0.004 |
| HYBRID_002f | 0.037 | 0.012 | 0.071 | 0.000 | 0.006 | 0.006 | 0.000 | 0.063 | 0.012 | 0.005 |

[New] [Copy] [Reset]

[OK] [Reset] [Cancel]

FIG. 6

Durability Part Number Table

| Part Number | Package Name | Lead Style Name | Lead Material Name |
|---|---|---|---|
| 172908-00K | 313_BGA_Package_100milpitch | HYBRID_002k | CU |
| 173332-00P | TI1-TSOP-54_10x22mm | HYBRID_024 | CU |
| 173334-11J | pdlp_208_1e | | |
| 173370-00L | 360_CECGA_Package | | |
| 173446-00K | 388_BGA_Package | | |
| 280-10020-101 | 280-10020-101 | | |
| 280-10025-101 | 280-10025-101 | | |
| 280-10025-102 | 280-10025-102 | | |
| 280-10025-103 | 280-10025-103 | | |
| 280-10025-104 | 280-10025-104 | | |
| 280-10025-105 | 280-10025-105 | | |

Material Table

| Name | Exp Coef | Density | Heat Capacity | Poisson | Shear Mod | Therm Cond | Strength | Young Mod |
|---|---|---|---|---|---|---|---|---|
| 63SN37PB | 0.000 | 0.000 | 0.000 | 0.000 | 0.000 | 0.000 | 0.000 | 0.000 |
| ABLEBOND8360 | 21.400 | 8378.00 | 214.000 | 0.370 | 1.280 | 51.000 | 3880.000 | 3.600 |
| AL | 45.000 | 3400.00 | 1000.000 | 0.350 | 300.000 | 2.900 | 2000.000 | 0.722 |
| ALBEMET | 21.600 | 2712.00 | 920.000 | 0.330 | 7.600 | 161.000 | 38000.000 | 10.622 |
| ALB_POLY | 13.900 | 2100.00 | 1926.000 | 0.140 | 11.400 | 296.000 | 55000.000 | 26.000 |
| ALHONEY | 13.980 | 1806.00 | 1574.000 | 0.210 | 6.920 | 164.580 | 32280.000 | 6.500 |
| ALUMINA | 21.600 | 500.00 | 920.000 | 0.330 | 2.440 | 29.000 | 38000.000 | 6.300 |
| AU | 7.100 | 3847.00 | 960.000 | 0.220 | 26.600 | 27.600 | 38450.000 | 40.000 |
| AUSN | 14.200 | 19400.00 | 127.000 | 0.420 | 3.980 | 315.000 | 14900.000 | 11.310 |
| BRAZE | 15.900 | 14510.00 | 163.000 | 0.300 | 3.300 | 57.000 | 40000.000 | 8.600 |
| BT_LAMINATE | 21.600 | 244.00 | 920.000 | 0.330 | 20.000 | 14.500 | 10000.000 | 5.300 |
| CER-A | 15.000 | 1439.00 | 1135.000 | 0.300 | 1.330 | 0.310 | 3880.000 | 2.460 |
| CER-B | 6.000 | 3847.00 | 960.000 | 0.220 | 16.390 | 27.600 | 28450.000 | 40.000 |
| CER-C | 9.000 | 2800.00 | 800.000 | 0.300 | 16.390 | 0.900 | 28450.000 | 40.000 |
| CER-R | 11.000 | 2800.00 | 800.000 | 0.300 | 16.390 | 0.900 | 28450.000 | 40.000 |
| CERA | 6.500 | 3847.00 | 960.000 | 0.220 | 25.600 | 27.600 | 28450.000 | 40.000 |
| CERB | 6.000 | 3847.00 | 960.000 | 0.220 | 16.390 | 27.600 | 28450.000 | 40.000 |
| CERC | 9.000 | 2800.00 | 800.000 | 0.300 | 16.390 | 0.900 | 28450.000 | 40.000 |
| CERR | 11.000 | 2800.00 | 800.000 | 0.300 | 16.390 | 0.900 | 28450.000 | 40.000 |
| CERR | 6.500 | 3847.00 | 960.000 | 0.220 | 25.600 | 27.600 | 28450.000 | 40.000 |

[New] [Copy] [Delete]

[OK] [Reset] [Cancel]

FIG. 7

METHOD, SYSTEM AND COMPUTER PROGRAM PRODUCT FOR MULTIDISCIPLINARY DESIGN ANALYSIS OF STRUCTURAL COMPONENTS

BACKGROUND OF THE INVENTION

This invention relates to design analysis of components and, more particularly, to a method, system and computer program product that provide for automated design analysis of components and the component interconnect structure by subjecting a finite element model of the component to various simulated thermo-mechanical environments and enabling modification of the component design and interconnect structure if the component's stress response to the environmental load is outside of pre-selected limits.

Components that are attached to an overall structure, such as an aircraft, automobile, bridge, etc. are subjected to various forces and temperatures over the lifetime of the overall structure. The components may be any type of board or panel-type structures with parts and/or electronic elements mounted thereupon, including printed wiring assemblies, printed wiring boards, chassis containing printed wiring assemblies or boards, transducers, and multifunctional parts with embedded electronics. Typically, the parts and/or electronic elements are attached in some way to the board or panel-type structure, such as by solder or solder balls, which is called the interconnect structure of the component. The forces and temperatures create stresses in the component that can eventually cause wear, damage, and the possible failure of the component interconnect structure, which may adversely affect the operation of the overall structure containing the component. As such, design analysis of the components is important to ensure that a component design does not cause it to have a shorter fatigue life than desired. Design analysis provides component and structural designers with critical information used to determine the likelihood and the causes of fatigue-related failures. Once the component and structural designers have the results of the design analysis, they can design the individual components and the overall structure so as to withstand the anticipated stress and temperature levels over the design lifetime.

The conventional method of design analysis involves initially designing a component using the processes and materials that have been shown, through testing or experience, to create the most durable and effective component. This design may be evaluated using military standards, such as the MIL Handbook 217 for electronics, and if it meets the standards, then a component having this design is built. The component design is tested by subjecting the component to accelerated stresses that are representative of forces or temperatures experienced by the component and the overall structure containing the component. The testing for each type of force and temperature must be performed separately and in separate chambers that simulate the desired testing environment. The testing environments may include, for instance, a thermal testing environment, a vibration testing environment, an acoustic testing environment, and a shock testing environment.

For example, if acoustic testing of the component is desired, then the component must have the exact type of boundary conditions that it will have in operation, i.e., the component must be mounted to the segment of the overall structure that will carry the component with the type of fasteners that will be used in operation. To acoustically test the component, the component and segment of the overall structure are placed in an acoustic chamber where the sonic load spectrum of the acoustic pressures at a typical operating environment are duplicated. The fluctuating acoustic pressure creates vibration base-excitement that acts upon the component. The response of the component is monitored and recorded to determine which parts of the component interconnect structure fail due to the vibration and when they fail, i.e. the failure mode. If the response of the component indicates that an integral part, such as an electronic element, of the component will fail prematurely, then the component interconnect structure must be redesigned to try to mitigate the effect of the vibration on the electronic element at issue. The redesign process may include moving the electronic element to a different portion of the board that is more resilient to vibration, changing the type of material that is used to make the electronic element to a material that is more resilient to vibration, and/or changing the type of material, such as solder, used to attach the electronic element to the board or panel-type structure, in addition to many other ways that the component may be redesigned. The redesigned component is then re-tested using the process described above and this cycle continues until the component design can withstand the acoustic test without any part of the component interconnect structure failing. Typically, it takes two to three cycles of design/redesign and testing before the component design is optimized.

The design/redesign and testing process is similar for the other testing environments and if a subsequent environmental test leads to another redesign of the component, then the component interconnect structure must be re-tested in the prior environment to monitor the response of the further redesigned component in the prior environment. The testing and re-testing continues in the desired environments until the component design is optimized for all of the environments.

Thus, the design/redesign and testing process is a very time consuming and expensive endeavor because of the multiple redesign and testing cycles that may be involved in obtaining an optimal component design and interconnect structure for all of the desired testing environments. In addition, because the testing in the environmental chamber consists of applying accelerated environmental loads to the component, it is not an accurate simulation of the environmental loads that the component will actually experience over the lifetime of the component or the overall structure. As such, accelerated testing generally induces failure mechanisms in the interconnect structure of the component that are different than those experienced by the component in application, which may create misleading failure results and lead to inaccurate redesigns. Furthermore, the military standards that may be used to evaluate the initial design of some components are too broad to assist in determining the impact of detail design changes on the fatigue life of a component. That is, the standards are not helpful for evaluating the design of components in which small design changes may greatly affect the fatigue life of the component interconnect structure in relation to a certain environment because the military standards do not approach the level of detail required for such an evaluation.

Therefore, the conventional design analysis procedure does not accurately identify potential failure points of a component interconnect structure that are associated with the design, manufacture and operation of the component. In addition, the conventional design analysis procedure is extremely expensive and time consuming. As such, there exists a need in the industry for a component design analysis that accurately and efficiently simulates thermo-mechanical environments for testing the component interconnect structure and identifies potential failures within the component interconnect structure when subjected to the environment(s). The need is also for a design analysis that predicts the fatigue life for the component or the part of the component interconnect structure that fails and pinpoints the cause of the failure in order to identify the part or other aspect of the component interconnect structure that must change.

BRIEF SUMMARY OF THE INVENTION

The method, system and computer program product of the present invention provides design analysis of a component that accurately and efficiently simulates thermo-mechanical environments for testing the component and identifies potential failures within the component interconnect structure when subjected to the environment(s). In addition, the method, system and computer program product of the present invention accurately identify potential failure points of a component interconnect structure that are associated with the design, manufacture and operation of the component. As such, the fatigue life for the component and/or any part of the component interconnect structure may be predicted and the exact cause of the failure may be pinpointed in order to identify the aspect of the component interconnect structure that must change.

The method, system and computer program product for design analysis of a component of the present invention include generating a finite element model of the component and receiving user-defined parameters that define a plurality of variables associated with the component. The plurality of variables that are received include at least one thermo-mechanical environment parameter. The thermo-mechanical environment parameter may be a thermal environment parameter, an acoustic environment parameter, a vibration environment parameter, and/or a shock environment parameter. The user-defined variables associated with the component that are received may also include at least one manufacturing parameter for the component, such as the type of solder used in the component, and at least one boundary condition for the component, such as the type of fasteners used to mount the component to the structure.

The method, system and computer program product of one embodiment of the present invention may also receive finite element properties and information regarding at least one part of the component. The information regarding at least one part of the component maybe received from a database of parts information following a definition of the part(s) by a user. The system of the present invention includes a client element for receiving the information described above and a processing element that is responsive to the client element and that also performs the functions described hereinbelow, unless otherwise specified.

The method, system and computer program product for design analysis of a component also subject the finite element model of the component to at least one environmental load and determine the stress response of the finite element model based upon the environmental load(s). The environmental load may be a thermal environmental load, an acoustic environmental load, a vibration environmental load, and/or a shock environmental load.

One advantageous embodiment of the method, system and computer program product of the present invention involves subjecting the finite element model of the component to at least one environmental load by subjecting the finite element model of the component to a computational first load and a computational second load. The maximum stress responses of the finite element model of the component to the computational first load and second load may be determined and a ratio constructed, which is a conversion factor for linking the two types of loads. This embodiment also may involve obtaining a first environmental load to test against the component and applying the ratio to the first environmental load in order to convert the first environmental load to represent an equivalent a second environmental load. The finite element model of the component may then be subjected to the equivalent of the second environmental load. In this embodiment, the stress response of the finite element model may be determined based upon the second environmental load.

To subject the finite element model of the component to an acoustic environmental load in the embodiment described above, the finite element model of the component may be subjected to a 1 psi uniform acoustic pressure load, which is the first computational load, and a 1 g negative based vibration acceleration load, which is the second computational load. The maximum stress responses of the finite element model of the component to the loads are determined and a ratio constructed, which is a conversion factor between an acoustic pressure load and a vibration acceleration load for the component. Prior to determining the maximum responses, the boundary conditions may be defined and applied to the finite element model of the component. This embodiment may also include obtaining either an acoustic pressure load or a vibration acceleration load to test against the component. If an acoustic pressure load is obtained, then applying the ratio to it converts it to an acceleration load. Alternatively, if a vibration acceleration load is obtained, then applying the ratio to it converts it to an acoustic pressure load.

Another advantageous embodiment of the method, system and computer program product of the present invention involves subjecting the component to an acoustic environmental load by simulating a comparable vibration acceleration environment. This embodiment includes subjecting the finite element model to a computational acoustic load, which may be a 1 psi uniform acoustic pressure load. Boundary conditions are applied to the finite element model and a maximum pressure response of the finite element model to the acoustic environmental load and boundary conditions is determined. The maximum pressure response is also based upon a selected sonic pressure load for testing against the component that is converted to a pressure power spectral density according to conventional techniques. The finite element model of the component is also subjected to a computational vibration acceleration load, which may be a 1 g negative based vibration acceleration load. The Boundary conditions are also applied to the finite element model and a maximum vibration acceleration response of the finite element model to the vibration acceleration environmental load and boundary conditions is determined. The maximum vibration acceleration response is also based upon the selected sonic pressure load for testing against the component that is converted to a pressure power spectral density according to conventional techniques. The maximum vibration acceleration response is determined by assuming the acceleration power spectral density is equal to the pressure power spectral density. The maximum pressure response and the maximum vibration acceleration response are placed in a ratio, which is a conversion factor for linking an acoustic environment to a vibration environment for the component. The ratio is then applied to the pressure power spectral density to convert it to an equivalent vibration acceleration power spectral density, and an input for a shaker table is generated according to the vibration acceleration spectral density. The component is secured to the shaker table, the vibration input is applied to the shaker table, and the response of the component to the vibration input is monitored.

Thus, the method, system and computer program product of the present invention provide automated design analysis of a component based upon user-defined parameters that include at least one thermo-mechanical environment parameter against which to test the component. A finite element model of the component is utilized, such that most, if not all, of the environmental testing may be computer generated via finite element analysis, which greatly decreases the expense and time involved in environmental testing. In addition, the finite element model of the component may be easily modified by altering the user-defined parameters of the component, such as the design and other features of the component, and regenerating the finite element model based upon the modified parameters. This is a significant advantage over the conventional design analysis process of redesigning and rebuilding the component after each environmental test, if necessary. Therefore, the method, system and computer program product of the present invention permit a structural or component designer to test prototype component designs without the expensive environmental chambers that are necessary in the conventional design analysis process. In addition, the components may be subjected to different testing environments simultaneously, which greatly decreases the time and expense of design analysis as compared to the conventional design analysis process in which the prototype component is subjected to each testing environment separately, particularly if the component must be redesigned and re-tested.

Furthermore, the method, system and computer program product of the present invention may subject the component to a type of environmental load that is time-consuming and expensive to generate, such as an acoustic load, the maximum stress responses of the component to a computational load of that environment and a computational load of an environment that is less time-consuming and less expensive to generate, such as a vibration environment. When the magnitude of the acoustic environmental load for which component testing is desired is known, it may be multiplied by the ratio to obtain the corresponding magnitude of the vibration environmental load. The vibration environmental load then may be applied to the component via a shaker table to obtain a component stress response that corresponds to the component stress response to the associated acoustic environmental load. Thus, the method, system and computer program product of the present invention provide an efficient process for subjecting a component to an acoustic environmental load by utilizing a corresponding vibration environment load.

The method, system and computer program product of the present invention further include determining whether the stress response is within pre-selected limits. If the stress response is outside of the pre-selected limits, then the method, system and computer program product of the present invention prompt modification of the design of the component and/or the user-defined parameters and regenerate the finite element model for the component. The method, system and computer program product of the present invention may also store the finite element model as a representation of the design of the component if the stress response is within the pre-selected limits. The system of the present invention may therefore include a storage element to store the finite element model as described above.

In one embodiment of the method, system and computer program product of the present invention, the stress response of the finite element model may be converted to a fatigue life for the component. The fatigue life may then be compared to a target fatigue life, which is a pre-selected limit for the component, to determine whether the stress response of the component is within the pre-selected limits. For this embodiment, if the fatigue life for the component is shorter than the target fatigue life for the component, then prompting modification of the design of the component and/or at least one user-defined parameter includes determining whether the component design and/or at least one user-defined parameter causes the fatigue life for the component to be shorter than the target life for the component.

Thus, the method, system and computer program product of the present invention provide analysis of the component's stress responses to the environmental loads by comparing the component's stress responses with pre-selected limits. The method, system and computer program product may also compute a fatigue life for the component or a part of the interconnect structure of the component based upon the stress responses to the environmental loads and compare it to a target fatigue life for the component. In addition, the method, system and computer program product identify the part(s) of the interconnect structure of the component that responded outside of the pre-selected limits, identify the type of environmental load that caused the part of the interconnect structure of the component to respond the way it did, prompt the user to modify the component design or other user-defined feature of the component at issue, and regenerate the finite element model of the modified component for further testing. Therefore, the method, system and computer program product of the present invention provide a complete analysis to the user that permits the user to immediately and appropriately modify the correct portion of the component, such that the user does not have to employ the trial and error procedure of the conventional design analysis to identify the reason that the component or portion of the component failed during testing.

Other embodiments of the method, system and computer program product of the present invention may also include creating a drawing of a design of the component prior to generating the finite element model of the component. The drawing may include creating a three dimensional computer aided drawing of the component design. In addition, the drawing of the component design may be a drawing of the design of the electronics imbedded in the component.

The method, system and computer program product for design analysis of a component of the present invention are therefore advantageous over the conventional design analysis techniques because they efficiently subject a finite element model of the component to the appropriate thermo-mechanical environment(s) for testing the component, evaluate the component's stress response to the environmental loads, and compare the stress response to pre-selected limits. In addition, the method, system and computer program product of the present invention accurately identify potential failure points of the component that are associated with the design, manufacture, and operation of the component, identify the type of environmental load that caused the failure, prompt the user to modify the design or other user-defined parameter of the component at issue, and further test a finite model of the modified component. Thus, the method, system and computer program product of the present invention provide an economical and timely design analysis for components that enables users to efficiently determine the appropriate design for the components based upon the type of thermo-mechanical environments to which the component will be subjected over its lifetime.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 4 is an illustration of an example of the type of parts and interconnect structure that the user may select to further define a printed wiring assembly for design analysis according to one embodiment of the method, system and computer program product of the present invention;

FIG. 5 is a user interface display representation of the parameters for which the user is prompted if the user selects a part and a ball grid array package from the parts database for design analysis according to one embodiment of the method, system and computer program product of the present invention;

FIG. 6 is a user interface display representation of the parameters for which the user is prompted if the user selects a part and a non-ball grid array package from the parts database for design analysis according to one embodiment of the method, system and computer program product of the present invention;

FIG. 7 is a user interface display representation of the material selection and material parameters for which the user is prompted if the user selects either the ball grid array or the non-ball grid array style package from the parts database for design analysis according to one embodiment of the method, system and computer program product of the present invention;

Figure 2:
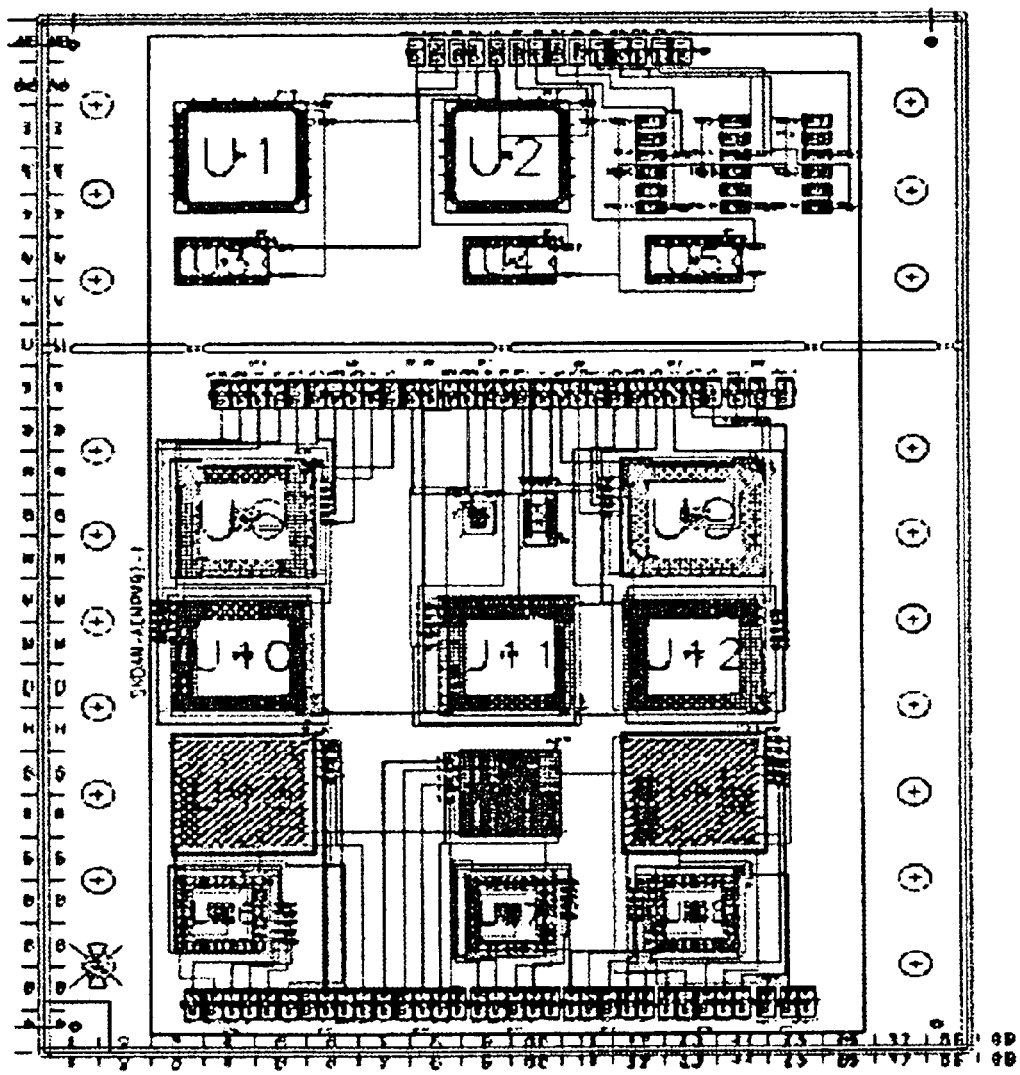
FIG. 2 is a user interface display of a computer aided drawing for a printed wiring assembly component for design analysis according to one embodiment of the method, system and computer program product of the present invention.
Figure 10:
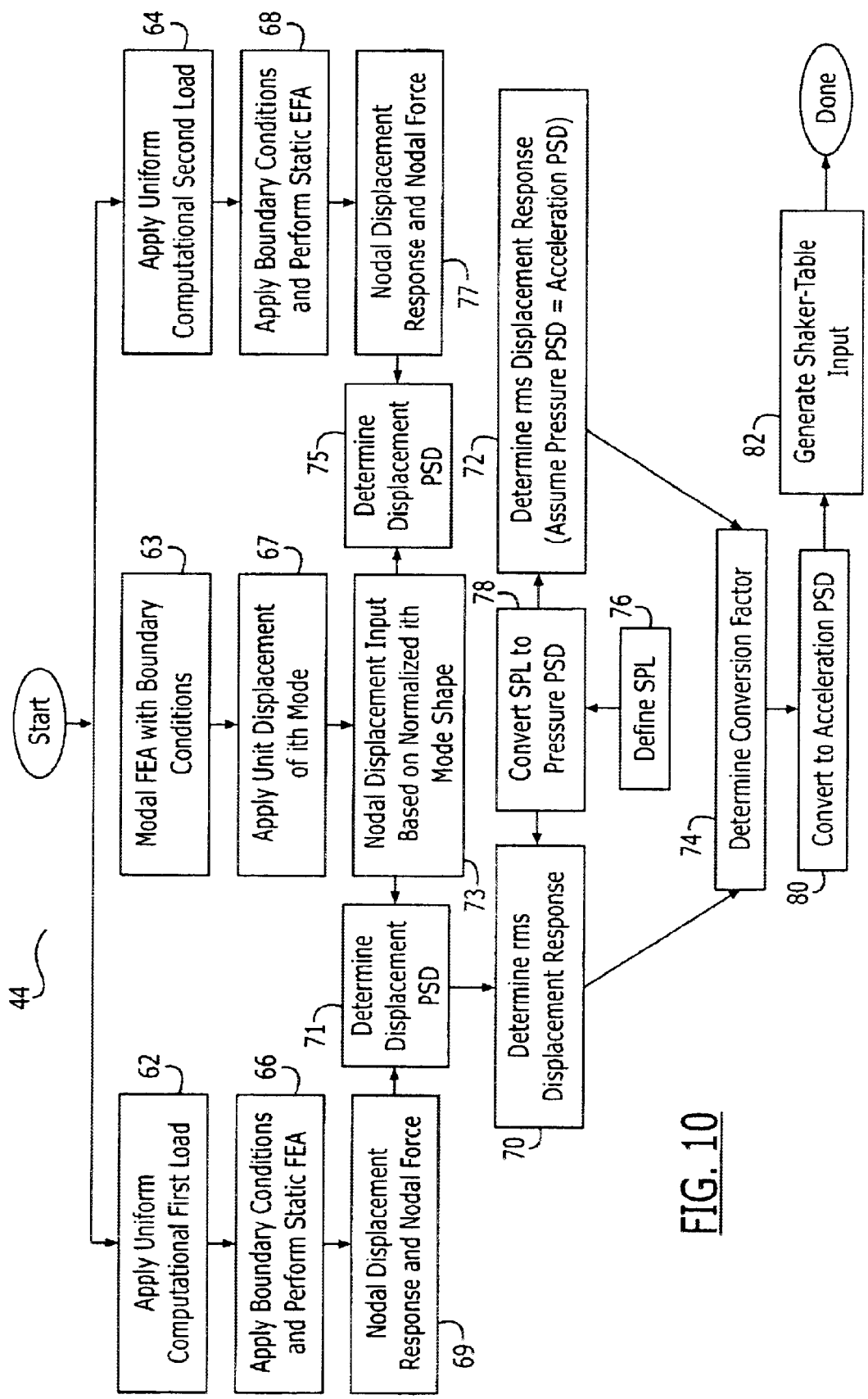
Figure 11:
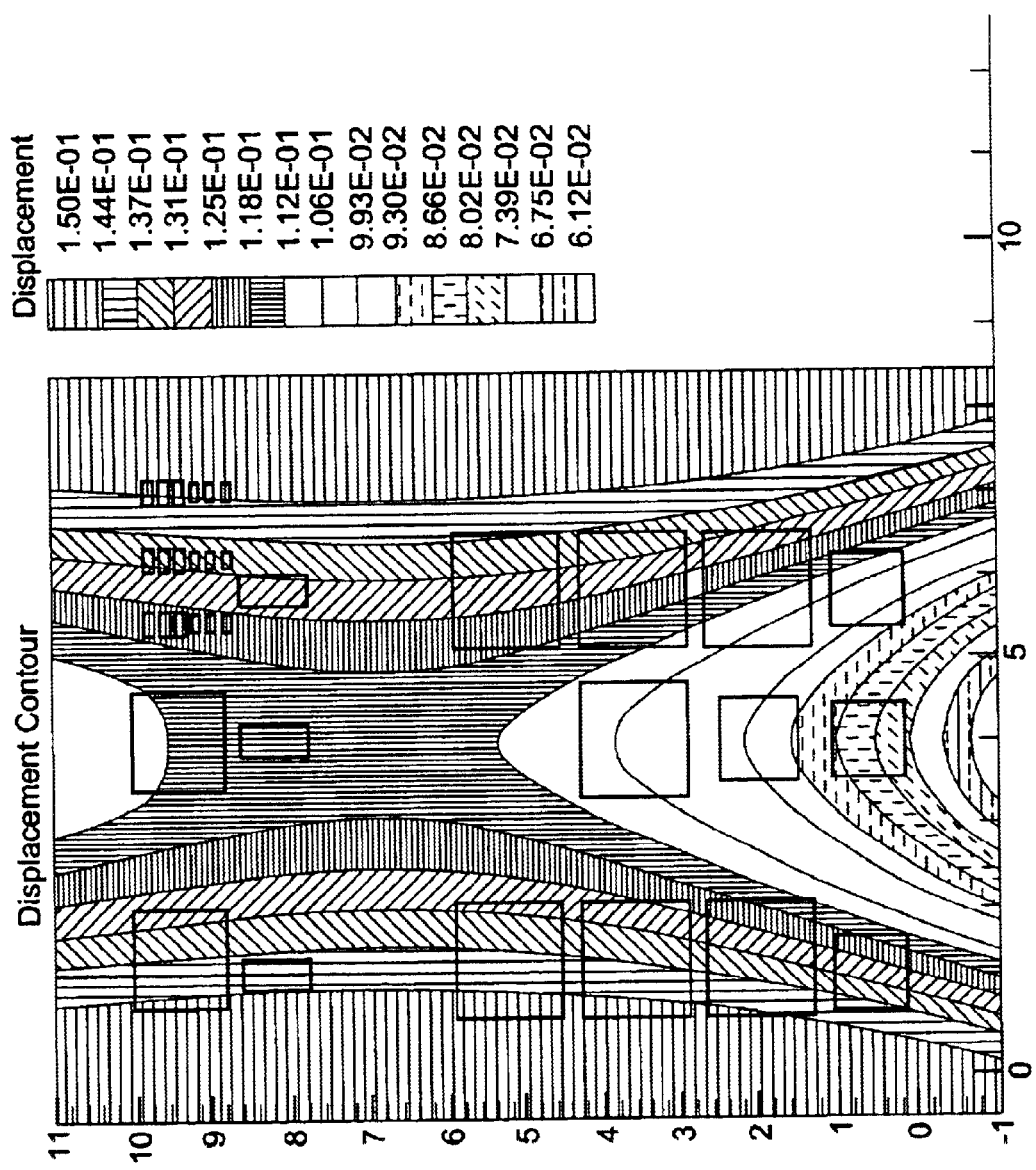
Figure 12:
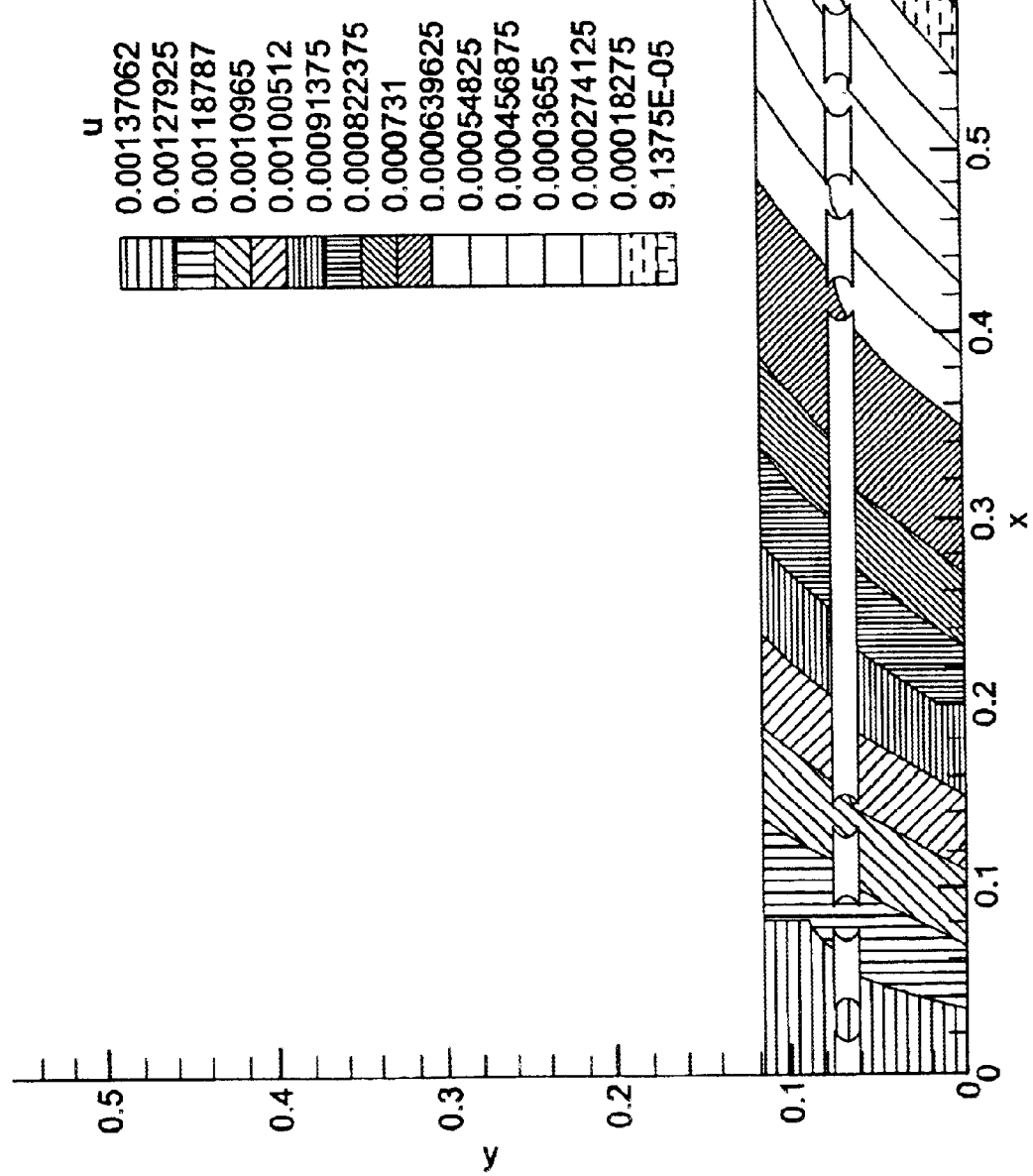
Figure 13:
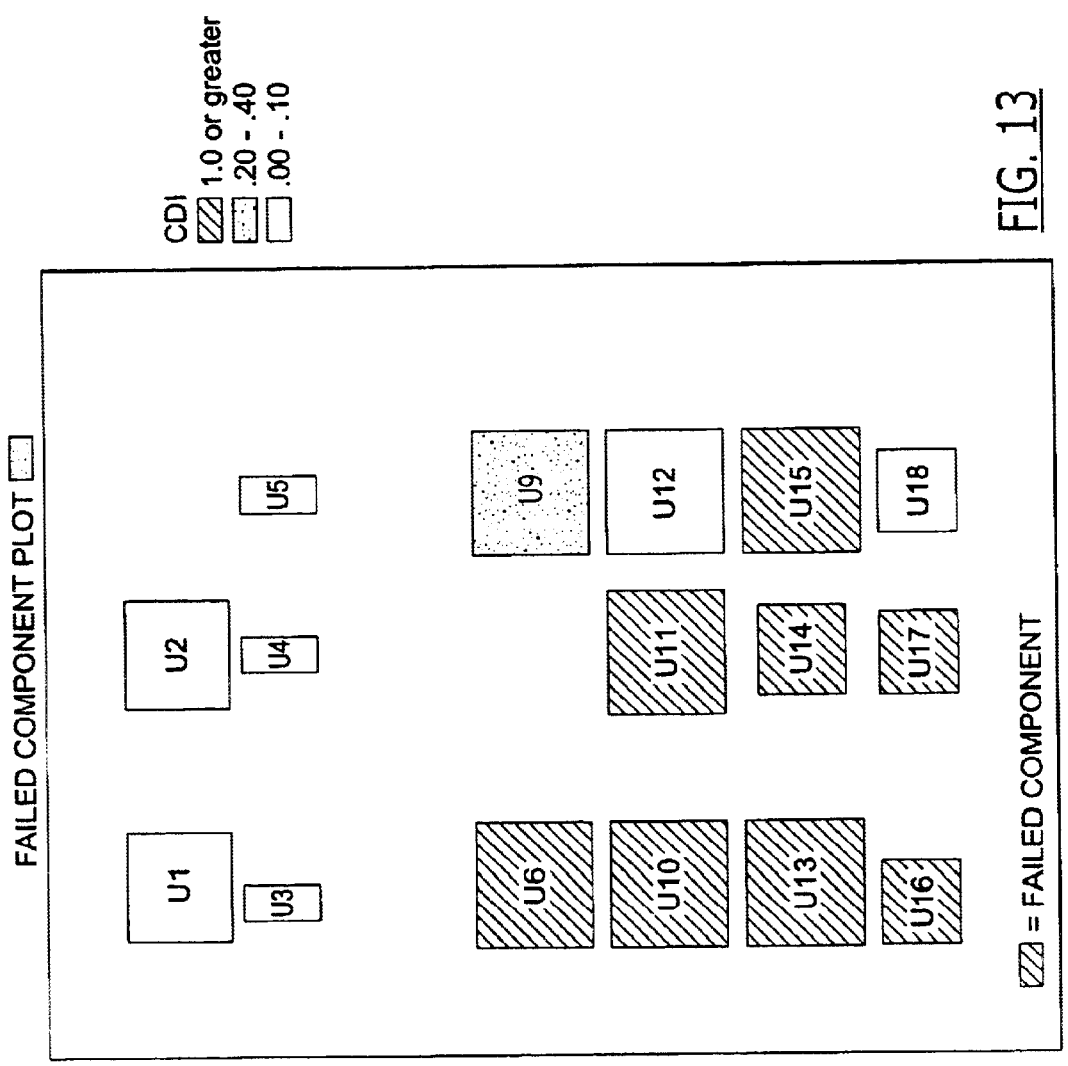

FIG. 10 is a flow diagram illustrating the operations of one example of generating a conversion factor to link a vibration environment and an acoustic environment for a component and of generating an input for a shaker table vibration test that corresponds to a desired acoustic environment test as performed by the method, system and computer program product of one embodiment of the present invention;

FIG. 11 is a representation of a displacement graph for the printed wiring assembly of FIG. 2, the shadings of which represent the different displacements of the board and the parts embedded in the board according to one embodiment of the method, system and computer program product of the present invention;

FIG. 12 is a representation of a deformation graph for one portion of the interconnect structure of the printed wiring assembly of FIG. 2 that includes a part connected to the board by a ball grid array, the shadings of which represent the different deformation areas of the solder balls, above which is the part and below which is the board according to one embodiment of the method, system and computer program product of the present invention; and FIG. 13 is a plot of the printed wiring assembly of FIG. 2 that indicates the parts of the printed wiring assembly having an interconnect structure that will fail under the environmental loads to which the printed wiring assembly was subjected during the finite element analysis according to one embodiment of the method, system and computer program product of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The method, system and computer program product for design analysis of a component of the present invention enable users to efficiently determine the appropriate design, including the interconnect structure, for the component based upon the type of thermo-mechanical environments to which the component will be subjected over its lifetime. By generating a finite element model of the component, receiving user-defined parameters that include at least one thermo-mechanical environment parameter, subjecting the finite element model to at least one environmental load, and determining the stress response of the finite element model based upon the environmental load(s), the method, system and computer program product of the present invention provide an economical and timely procedure for determining the component's stress response, including the component's interconnect structure stress response, to the appropriate environments. In addition, because the method, system and computer program product of the present invention determine whether the stress response is within pre-selected limits and if not, prompt modification of the design of the component and/or at least one of the user-defined parameters and regenerate the finite element model for the modified component, the user is provided with an efficient procedure for redesigning and re-testing the component that eliminates the time-consuming and costly redesign and re-testing procedures of conventional design analysis.

Figure 1:
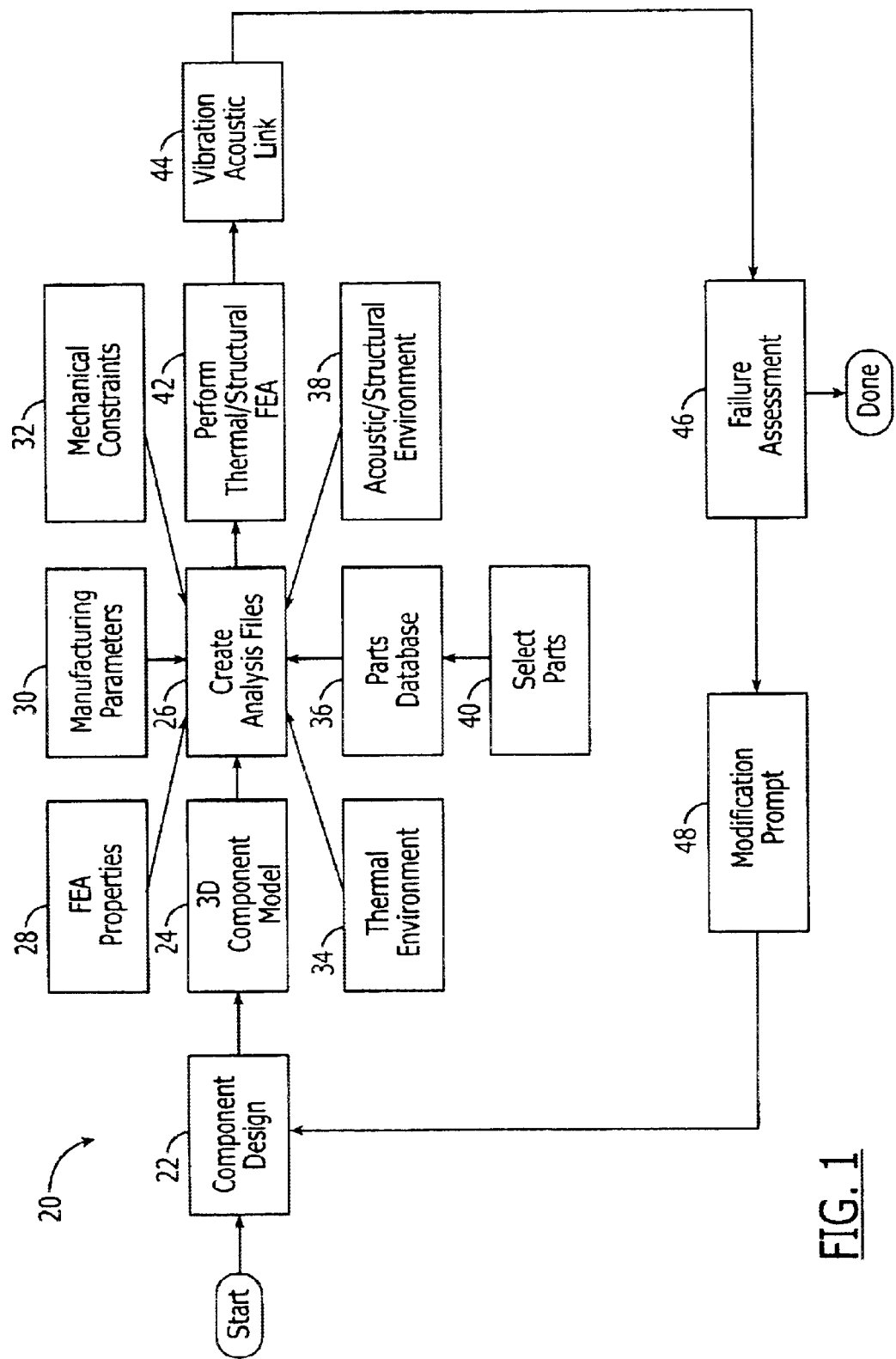
FIG. 1 is a flow diagram illustrating the operations of one example of a design analysis for a component as performed by the method, system and computer program product of one embodiment of the present invention.

FIG. 1 is a flow diagram of one example of a design analysis 20 for a component as performed by the method, system and computer program product of one embodiment of the present invention. The design analysis generally begins with a component design 22. The components may be any type of board or panel-type structures with parts and/or electronic elements mounted thereupon, including printed wiring assemblies, printed wiring boards, chassis containing printed wiring assemblies or boards, transducers, and multifunctional parts with embedded electronics. Typically, the parts and/or electronic elements are attached in some way to the board or panel-type structure, such as by solder or solder balls, which is called the interconnect structure of the component. The component design 22 is typically a Computer Aided Drawing (CAD) of the component. The CAD of the component may be created by any two-dimensional CAD program, such as Mentor Graphics, commercially available from Mentor Graphics Corportion, Wilsonville, Oreg. The component design 22 also may include the design of the electronics and/or parts embedded in the component. FIG. 2 is a representative display of a CAD model for a printed wiring assembly component. The initial component design is based upon the best information available to the designer regarding the function of the component and its placement in the overall structure, and the processes and materials that have been shown, though testing or experience, to create the most durable and effective component.

A three-dimensional component model 24 is created based upon the geometry of the component design 22. The three-dimensional component model 24 is a three-dimensional, detailed geometry of the component design based upon the two-dimensional CAD model that supports finite element modeling of the component. Finite element modeling includes dividing the parts and/or electronics embedded in the component into a mesh of many small segments in order to monitor the component at a detailed finite element level. Typically, the three-dimensional component model 24 is developed after using the Standard for the Exchange of Product model data (STEP) technology, which is a neutral system that provides key geometric and material attributes to further define the two-dimensional component design. Specifically, for a printed wiring assembly, STEP module AP210may be utilized to define the details of the printed wiring assembly, including the layers of the board, and create a set of files to support the generation of the finite element model. For example, if the printed wiring assembly contains a part that generates heat, such as a power supply, the board of the printed wiring assembly preferably contains a core metallic layer to dissipate the heat, and this must further be defined by the STEP AP210 files. The STEP AP210 files may then be inputted, along with information regarding the geometry of the component, into an interfacing program that creates a set of files for constructing the finite element model of the component. For example, for a printed wiring assembly, the geometry of the board, parts, core, and covers are inputted into the interfacing program. The interfacing program then idealizes the geometry of the printed wiring assembly by removing small geometric features, such as small electronics or parts and narrow channels between the electronics or parts. The interfacing program also creates a set of files from which a three-dimensional component model 24 may be built. The files may include a file containing the two-dimensional geometry definition of the component to input into the finite element modeling program described below, a file containing the composite representation of the component, such as the board and parts of the printed wiring assembly, that accounts for the stiffness and material properties of all aspects of the component, a file that defines the nominal power dissipation for each part of the component, and a file that provides the board layer properties (i.e. the top, bottom, and core layers) and the composite material representation for each board layer.

In addition to the three-dimensional component model 24 a number of parameters that further define the component or other properties of the design analysis may be provided by a user. FIG. 1 further illustrates one example of the manner in which the method, system and computer program product of the present invention may receive user-defined parameters for variables associated with the component, the interconnect structure of the component, and other properties of the design analysis to create analysis files 26. As such, a finite element model of the component is created in the analysis files 26 using any finite element preprocessor modeling program known to those skilled in the art, such as Ls-Maze commercially available from Lawrance Software Technology Corporation (LSTC) in Livermore, Calif. The finite element model created in the analysis files 26 is based upon the three-dimensional component model 24 Finite Element Model (FEM) properties 28, defined manufacturing parameters 30, user-defined mechanical constraints 32, user-defined selected parts 40 that may be chosen from a parts database 36 a user-defined thermal environment description 34, and/or a user-defined acoustic/structural environment description 38. As mentioned above, creating analysis files 26 is one example of a manner in which the method, system and computer program product of the present invention receives user-defined parameters and other information for the design analysis of a component. Alternatively, this information may be directly received by a finite element analysis (FEA) program or it may be entered into the design analysis process in any other manner known to those skilled in the art.

Figure 3:
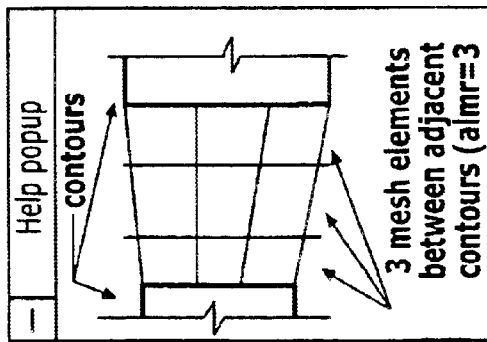
FIG. 3 is a user interface display representation in which user parameters are entered to define the mesh of the Finite Element Model (FEM) for design analysis according to one embodiment of the method, system and computer program product of the present invention.

The FEM properties 28 further define the type of finite element model that will be generated. The FEM properties 28 describe in detail the mesh that divides the component design, including the parts and/or electronics embedded in the component, into many small segments in order to monitor the component at a detailed level. FIG. 3 is a representation of the user interface in which user parameters are entered to define the mesh of the FEM. Alternatively, the FEM properties 28 may be provided by the user in a file, such as an ASCII file that is read by the finite element modeling program to create the FEM of the component.

The user-defined manufacturing parameters 30 may specify the type of materials, dimensions, or the like and the permissible alterations in the materials, dimensions or the like that may be altered during the manufacture of the component. For example, a manufacturing parameter 30 may be the type of solder used to fuse electronics or other parts to the board in a printed wiring assembly or the size of the copper pads in a printed wiring assembly to which solder is adhered. The user may be prompted to enter the manufacturing parameters 30 in a user interface similar to the manner in which the FEM properties 28 may be entered by a user, or the user may provide a file containing the manufacturing parameters 30 for the component, such as an ASCII file that is included in the analysis files 26.

The user-defined mechanical constraints 32 include any type of boundary conditions for the component. The boundary conditions include, for example, the fasteners and/or connectors that mount the component to the overall structure. The user may be prompted to enter the mechanical constraints 32 in a user interface similar to the manner in which the FEM properties 28 may be entered by a user, or the user may provide a file containing the mechanical constraints 32 for the component, such as an ASCII file that is included in the analysis files 26.

The select parts 40 represent the user-selected parts and/or electronics that are attached to the board and the manner in which they are attached, i.e. the package style, which defines the overall interconnect structure. The user may select the parts and package sytle from a parts database 36. FIG. 4 depicts an example of a user interface that illustrates the type of parts and the package styles for the parts that are stored in a parts database 36 from which the user may select when further defining a printed wiring assembly and its interconnect structure for design analysis. Thus, the user may select the specific type of component, such as an inductor 54 or diode 52, or a general part 56 (designated as "component" in FIG. 2) with a specific type of attachment to the printed wiring board (i.e. package style), such as a gull wing 58 or plastic ball grid arrays 59. Once the user selects a part, the user may be prompted to enter key attributes regarding various aspects of the part and its attachment to the printed wiring board. For example, if the user selects a part and a ball grid array package, the user is prompted for the substrate and solder ball parameters, as represented in FIG. 5. If the user selects a part and a non-ball grid array package, then the user is prompted for the lead geometry, as represented in FIG. 6. In both the ball grid array and non-ball grid array style packages, the user is prompted to specify the material of the part and the parameters of the material, as represented in FIG. 7. Alternatively, the user may enter new part information and style packages without reference to a parts database 36 and may store the new part information and style packages in the parts database 36.

The user also may define the environments to which the component will be subjected over its lifetime. These environments may include, for example, a thermal environment, a shock environment, a vibration environment, and/or an acoustic environment. The thermal environment 34 is a temperature profile for the component throughout the life of the component and the overall structure containing the component. The temperature profile may be a duty cycle profile wherein the user may specify the number of cycles over the lifetime for each temperature level. The shock environment may be an aspect of defining an acoustic/structural environment 38. The shock environment may be represented as an acceleration load that is a function of frequency, similar to the vibration environment discussed hereinbelow, or, alternatively, as a transient response to an impact load.

The vibration environment may also be part of defining the acoustic/structural environment 38. The vibration environment may be defined as a vibration acceleration load that is a function of frequency. Preferably, a mode-acceleration method is utilized to generate a random vibration response and to achieve numerical performance. The mode-acceleration method is preferred because it performs the structural dynamic finite element analyses efficiently in terms of computer processing costs and storage requirements, but similar commercial methods may be used also, such as the mode-superposition method. In addition, the acoustic environment may be part of the acoustic/structural environment 38. The acoustic environment may be defined as a sonic load spectrum. The sonic load spectrum is preferably represented as sound pressure levels that are a function of frequency. By way of example, the process of defining thermal, shock, vibration and/or acoustic environments is specifically described hereinabove, but any type of thermo-mechanical environment may be defined for the component design analysis of the method, system and computer program product of the present invention. Also, the system generally displays a number of different screens to the user soliciting input of the foregoing information. The user may, however, provide the foregoing information in other manners known to those skilled in the art.

Figure 8:
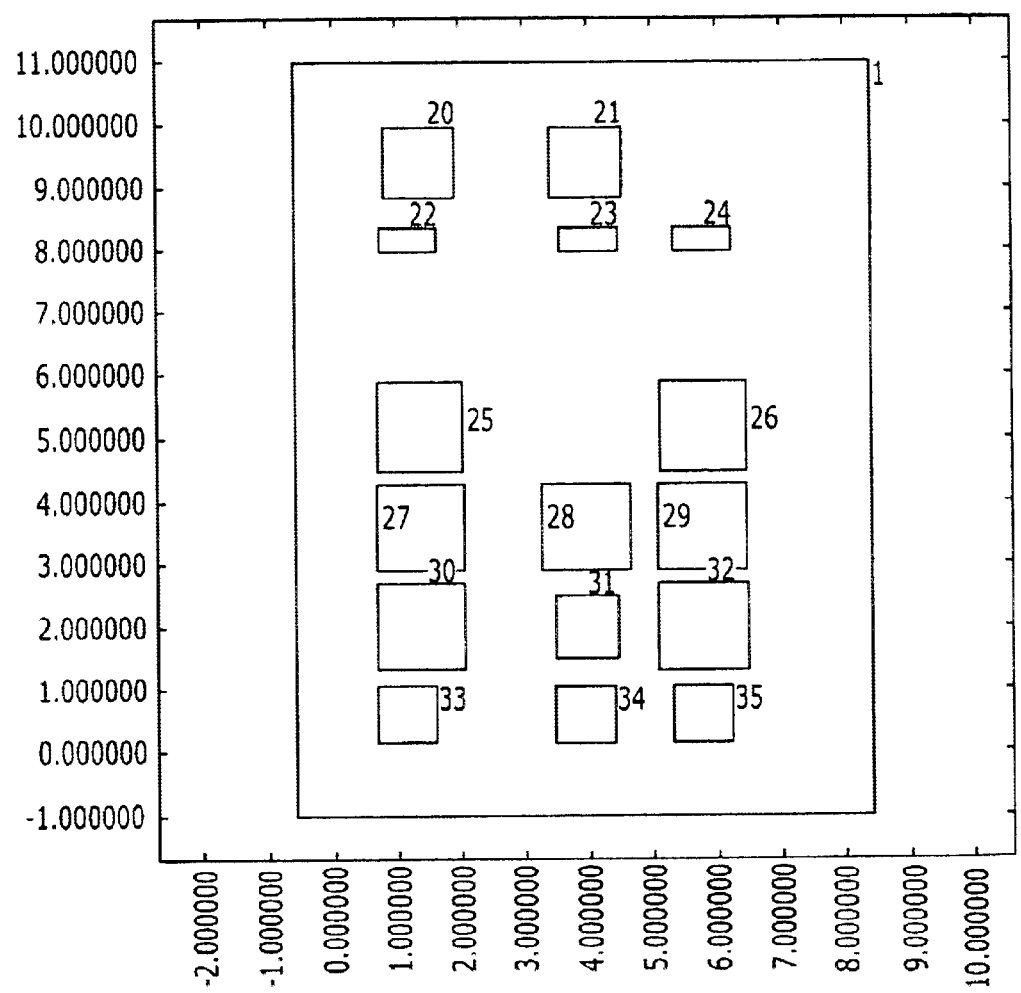
FIG. 8 illustrates the idealized representation of the computer-aided drawing of the printed wiring assembly of FIG. 2 that filters out all of the non-defined parts of the printed wiring assembly for design analysis according to one embodiment of the method, system and computer program product of the present invention.
Figure 9:
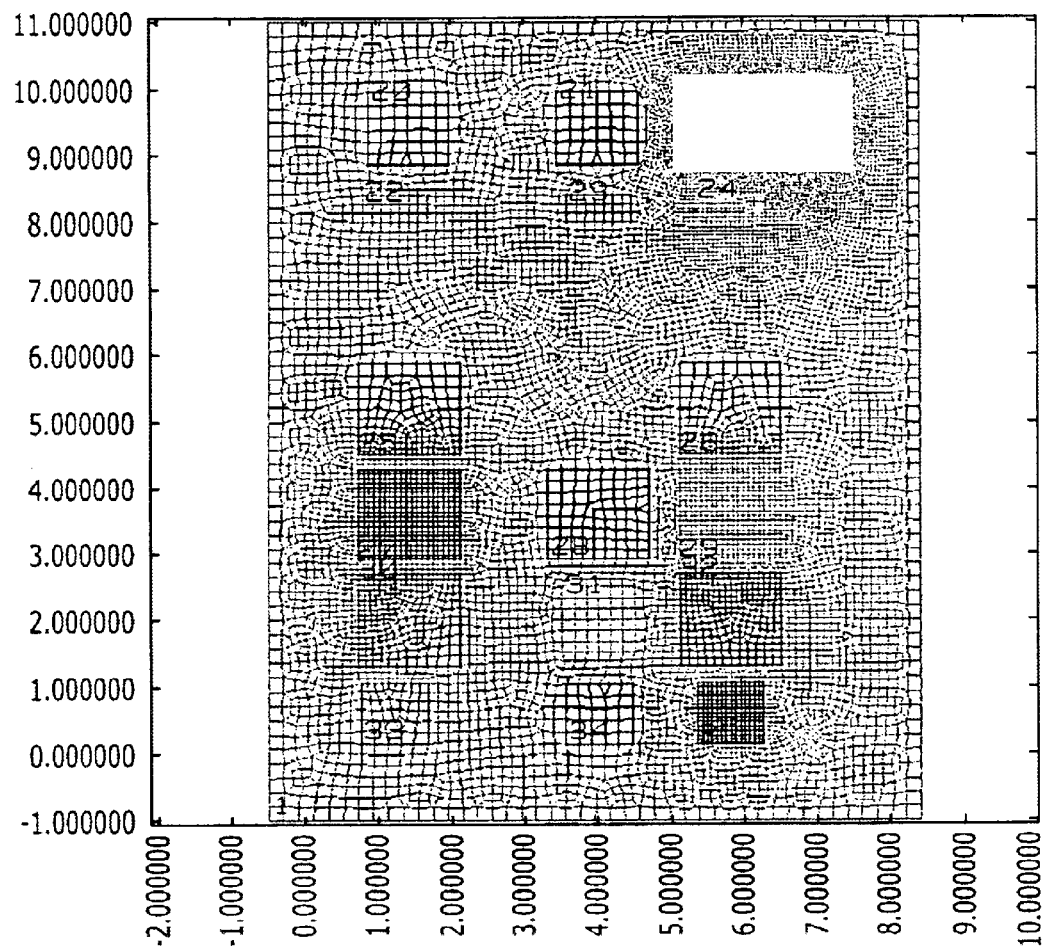
FIG. 9 illustrates the finite element model of the printed wiring assembly of FIGS. 2 and 8 for design analysis according to one embodiment of the method, system and computer program product of the present invention.

Once the user-defined parameters, including at least one environment parameter, and the other properties of the design analysis are received, analysis files 26 consisting of the finite element model and the user-defined parameters are constructed. The finite element model of the component is created by filtering out all of the non-defined parts from the three-dimensional component model 24 which may be referred to as idealization. FIG. 8 illustrates the idealized representation of the CAD of the printed wiring assembly of FIG. 2. The finite element model is then generated by applying the FEM properties 28, which includes the mesh parameters, to divide the component into many segments, each segment having individual properties that will be analyzed according to finite element theory. FIG. 9 is an illustration of the FEM of the printed wiring assembly of FIGS. 2 and 8.

The finite element model of the component may then be subjected to the environmental load(s), such as a thermal load, a vibration load, a shock load, and/or an acoustic load. The environmental load(s) may be applied to the finite element model of the component by finite element analysis/analyses. Any type of thermal/structural Finite Element Analysis (FEA) program known to those skilled in the art may be utilized to subject the finite element model of the component to the environmental load(s). For example, the NIKE3D FEA program available from the U.S. Department of Engery or NASTRAN FEA program commercially available from MacNeal-Schwendler Corporation may be utilized. Performing the thermal/structural FEA 42 also includes determining a stress response of the finite element model based upon the environmental load(s). This is a global FEA that will support the detailed stress FEA as discussed hereinbelow.

In addition to the thermal/structural FEA, the finite element model is subjected to various acoustic loads to determine the acceptability of its response. Subjecting the finite element model of the component to an acoustic environmental load of acoustic pressure fluctuations, random both in time and space, and determining the stress response of the finite element model essentially reduces to evaluating a dimensionless quantity known in the art as "joint acceptance". Joint acceptance corresponds to the coupling between the excitation pressure field and the structure.

The joint acceptance function is defined by:

$$J_{jm}(\omega) = \frac{1}{A^2} \int_a \int_{a'} C(\underline{r}, \underline{r}', \omega) \phi_j(\underline{r}) \varphi_m(\underline{r}') d\underline{a} d\underline{a}'$$

$d\underline{a}, d\underline{a}'$=infinitesimal area vectors $C(\underline{r},\underline{r}',\omega)$=cross-power spectral density coefficient of the sound pressure field A=pressure surface area $\underline{r},\underline{r}'$=space vectors locating points on the structure The joint acceptance is computed by mapping the differential elements in integration space using the Jacobi method at the integrated degrees of freedom.

Displacement power spectral density response, $W_y(\underline{r},\omega)$ is equal to:

$$W_y(\underline{r}, \omega) = \frac{A^2 G(\omega)}{\omega^4} \sum_j \sum_m \frac{\phi_j(\underline{r}) \phi_m(\underline{r}) J_{jm}(\omega)}{M_j M_m |H_j(\omega)| |H_m(\omega)|}$$

-continued $$\text{where} \quad H_j(\omega) = \left(-1 + 2\xi_j \operatorname{Im} + \frac{\omega_j^2}{\omega^2}\right)$$

$M_j$, $M_m = j^{th}$, and $m^{th}$ elements of generalized mass matrix $\phi_j(\underline{r}) = j^{th}$ normal mode shape $|\cdot|$ = amplitude of complex variable $G(\omega)$ = reference power spectral density of sound pressure $J_{jm}(\omega)$ = joint acceptance The root-mean-square displacement is given by $$u(\underline{r}) = \left(\int_{\omega_1}^{\omega_f} W_y(\underline{r}, \omega) d\omega\right)^{1/2}$$

Modal joint acceptance was first applied to a simply supported beam in "On The Fatigue Failure Of Structure Due To Vibrations Excited By Random Pressure Fields", *Journal of Acoustical Society of America*, Volume 30, No. 12, December 1958, Pages 1130–1135. Subsequent development yielded a method to determine the modal joint acceptance of a flat or cylindrical panel structure with arbitrary boundary conditions with a homogeneous random pressure field. Predictive methods were also developed to quantify the random excitation of the structure due to boundary layer noise.

Thus, because the response of a component to a sonic load spectrum depends in a complex way on its position relative to the source, the existence of intervening structure, and the orientation of the panel in space, FEA for an acoustic environment still requires a prototype component to be subjected to a sonic load spectrum. Building a prototype component is generally not a time-consuming or expensive process, but subjecting the prototype to a sonic load spectrum by placing the prototype in an acoustic chamber where the sonic load spectrum of the acoustic pressures at a typical operating environment is generated is a complex and expensive process. Therefore, the method, system and computer program product of the present invention preferably utilize a vibration acoustic link 44 to obtain the component's response to a specific acoustic environment by generating a vibration environment that corresponds to the desired acoustic environment to test the prototype component, which is a much less complex and less expensive process. Similar methods of testing the response of a panel structure to acoustic pressure by simulating the sonic load spectrum of the acoustic pressure with a vibration spectrum on a shaker table are detailed in U.S. patent application Ser. No. 09/584,646 entitled Acoustic Pressure Load Conversion Method to Vibration Sprectra, filed on May 31, 2000, the contents of which are incorporated herein by reference in their entirety.

The vibration acoustic link 44 of the method, system and computer program product of the present invention generates a conversion factor to link a vibration environment and an acoustic environment for a prototype component and an input for a shaker table vibration test that corresponds to a desired acoustic environment test. FIG. 10 illustrates the operations of one example of the vibration acoustic link 44. These operations commence with dual processes beginning at blocks 62 and 64. In block 62, the Finite Element Model (FEM) 24 of the component is subjected to a uniform computational first load, which may be an acoustic wave having a uniform pressure load. More particularly, a 1 psi uniform pressure load may be applied to the FEM of the component as a means to map a given acoustic pressure. Preferably, a known mode-superposition method is utilized to account for the joint acceptance function. After applying the acoustic pressure load at block 62, the vibration acoustic link procedure may advance to block 66.

In block 66, boundary conditions consistent with the in situ structural mount conditions of the component are applied to the prototype component as it is mounted to a structure. Such boundary conditions may include, for example, the fasteners or connectors holding the component to the structure. Static analysis is then run on the prototype component and the boundary conditions using a Finite Element Analysis (FEA) program, as also represented by block 66. The FEA program may be any type of FEA program known to those skilled in the art, for example, NIKE3D available from the U.S. Department of Energy or NASTRAN commercially available from MacNeal-Schwandler Corporation. In block 69, the nodal displacement response due to the base excitation of the pressure load is determined. The nodal force due to the base excitation of the pressure load is also determined in block 69 in order to ensure the nodal forces are consistent with the unit pressure. Referring to block 64, the vibration acoustic link procedure also applies a computational second load to the FEM of the component. The computational second load is a vibration load in this example, but may be other types of loads having a predictable relationship to the computational first load, i.e., an acoustic load. The vibration load preferably is in the form of an acceleration load. More particularly, a 1 g negative base-acceleration load is applied to the FEM of the component as a necessary lead case toward random vibration analysis. Preferably, the vibration acoustic link procedure utilizes a known mode-acceleration method for generating the acceleration load, such as random vibration, to achieve numerical performance. After applying the acceleration load at block 64, the vibration acoustic link procedure continues to block 68, where the same boundary conditions that were applied for the first computational load are applied to the FEM of the component. A FEA program is then run on the FEM and boundary conditions for static analysis of the component at block 68. Like the first computational load example, the FEA program may be any type of FEA program known to those skilled in the art, for example, NIKE3D available from the U.S. Department of Energy or NASTRAN commercially available from MacNeal Schwendler Corporation. In block 77, the nodal displacement response due to the base excitation of the pressure load is determined. The nodal force due to the base excitation of the pressure load is also determined in block 77 in order to ensure the nodal forces are consistent with the unit pressure.

In block 63, a modal FEA is performed on the FEM of the component with the same boundary conditions as applied in blocks 66 and 68 for the Static FEA. A normalized "ith" mode unit displacement is then applied to the FEM of the component in block 67 in order to determine the nodal displacement input based upon the normalized "ith" mode shape in block 73. The normalized nodal displacement input from block 73 is utilized along with the nodal displacement response and nodal force of block 69 to determine the displacement power spectral density for the first computational load, i.e. the pressure load, in block 71. The normalized nodal displacement input from block 73 is also utilized along with the nodal displacement response and nodal force of block 77 to determine the displacement power spectral density for the second computational load, i.e. the acceleration load, in block 75.

To determine the root means square displacement response of the FEM of the component, the maximum response of the FEM to the computational first load and boundary conditions, which are the acoustic pressure load and boundary conditions for this example, is determined. In block 70, the root mean square displacement response of the FEM of the component to the displacement power spectral density for the first computational load and boundary conditions (from block 71) is determined based upon the pressure power spectral density from block 78.

To determine the pressure power spectral density in block 78, the Sound Pressure Level (SPL) (i.e., the sonic load spectrum) that a prototype of the component is to be tested against must be defined in block 76. Typically, the SPL is received from a designer as the user-defined sonic load spectrum received during the acoustic/structural environment definition 38 of FIG. 1. After defining the SPL at block 76, the vibration acoustic link procedure continues to block 78.

In block 78, the SPL is converted to a pressure level power spectral density. This is preferably accomplished using techniques known to those skilled in the art, such as one-third-octave sound pressure level via:

$$G(f) = 8.41 \times 10^{(SPL/10)-18}/0.231 f_c$$

wherein $f_c$ is the center frequency.

The pressure power spectral density of block 78 is also used in determining the maximum response of the FEM to the computational second load and boundary conditions, which are the acceleration load and boundary conditions for this example. In block 72, the root mean square displacement response of the FEM of the component to the displacement power spectral density for the computational second load and boundary conditions (from block 75) is determined based upon the pressure power spectral density from block 78. The pressure power spectral density is assumed to be equivalent in both shape and magnitude to the acceleration power spectral density for the purpose of this determination.

From blocks 70 and 72, the vibration acoustic link procedure continues to block 74. In block 74, the ratio of the peak root means square displacement responses of the FEM of the component as represented by blocks 70 and 72 is determined. More particularly, in block 74, the ratio of the maximum response of the component FEM to the pressure power spectral density load to the maximum response of the component FEM to the assumed acceleration power spectral density load is determined. This ratio is a scalar, which is independent of space and frequency. As such, the ratio can be used as a conversion factor for converting an acoustic environment to a vibration environment and vice versa. Once the conversion factor has been computed, as represented by block 74, a vibration test can be employed for simulating an acoustic pressure test.

In block 80, the pressure level power spectral density is converted to an acceleration level power spectral density. This conversion is made by applying the conversion factor determined at block 74 to a pressure level power spectral density to yield the equivalent acceleration level power spectral density. If desired, the inversion of the conversion factor may be used to convert an acceleration level power spectral density to a pressure level power spectral density. After determining the acceleration level power spectral density at block 80, an input for a shaker-table test is determined at block 82 from the acceleration level power spectral density determined at block 80. The prototype component can then be secured to the shaker-table and monitored for its response to the input. After applying the shaker-table input at block 82, the vibration acoustic procedure terminates.

In an alternative embodiment, the root means square displacement responses of blocks 70 and 72 may be determined without reference to the pressure power spectral density of block 78. In this situation, the pressure power spectral density of block 78 may be applied directly to the conversion factor of block 74 to determine the acceleration power spectral density in block 80.

It should be noted that the general method of relating an acoustic input to a vibration input has been illustrated as implemented in a NIKE3D system in a dual path but can be equally implemented to other systems. Further, the method utilizes mode-superposition for acoustic pressure and mode-acceleration for random vibration. Note that mode-acceleration does not constitute the joint acceptance function. As such, mode-acceleration cannot be employed in a straightforward manner for solving acoustic problems. However, the mode-superposition method can be used to simulate both acoustic pressure and acceleration spectral-density generalized forces. The use of mode-acceleration is preferred for vibration analysis to enable an improved convergence and a shorter computing time compared to mode-superposition.

Once the global thermal and/or structural FEA, including the vibration acoustic link FEA, is completed, detailed stress FEA may be performed. This type of detailed stress FEA forms the basis for the failure assessment 46. The failure assessment 46 may include comparing the stress responses of the component, including the interconnect structure of the component, determined during the global FEA to pre-selected limits in order to determine which portion(s) of the component did not respond within the pre-selected limits, if any. Any type of detailed stress FEA may be utilized, for example, a multidomain stress analysis and/or constitutive modeling of a durability-critical portion of the component may be performed using an appropriate detailed stress FEA program, such as the Reduced and Accelerated Disturbed State Concept (RADSC) program, commercially available from C. Desai Incorporated in Tuscon, Ariz.

The multidomain analysis may produce graphical representations of various types of responses of the parts of the component and the interconnect structure of the component due to the stress of the environmental loads applied to the component during the global FEA. For instance, if environmental loads are applied to a printed wiring assembly, the multidomain analysis may produce a graphical representation of the displacement response of the printed wiring assembly to the stress of the environmental loads applied to the printed wiring assembly during the global FEA. FIG. 11 is a representation of a displacement response graph for the printed wiring assembly of FIG. 2. As the key indicates, the portions of the graph that are cross-hatched differently represent the different displacements in inches, and the graph shows the locations of the parts on the printed wiring board such that the parts near the greatest amount of displacement may be identified.

Another response-type of multidomain analysis measures the deformation that the solder balls experience due to the stress of the environmental loads applied to the printed wiring assembly during the global FEA. This is a plain strain, two-dimensional analysis through a diagonal cross-section of a part of the component. FIG. 12 is a representation of a deformation graph for one part of the printed wiring assembly of FIG. 2. As the key indicates, the portions of the graph that are cross-hatched differently represent the different deformation areas, and the graph shows the locations of the solder balls, above which is the part and below Thus, the solder balls experiencing the greatest amount of deformation may be identified by the cross-hatching that corresponds to the greatest number in the key.

In addition, the RADSC analysis may convert the stress responses of the parts and/or interconnect structure of the component to a fatigue life prediction for the parts of the component. For the printed wiring assembly example, a Ball Grid Array (BGA) prediction may be performed by the RADSC analysis. The BGA prediction further analyzes the stress response of the solder balls of the printed wiring assembly in order to determine which solder ball(s) are likely to fail and where the stress on the failing solder ball(s) is the greatest. This information provides the basis for which the RADSC analysis predicts the fatigue life of the solder ball(s) at issue. Any fatigue life prediction technique known to those skilled in the art may be utilized, for example, after the multidomain analysis has generated all of the responses described above, the strain range for the solder ball(s) that corresponds to the maximum temperature change may be applied to an empirical equation that converts the strain to the number of cycles to failure. In this example, the empirical equation is a known Coffin-Mason fatigue rule. These and other detailed FEA programs enable the method, system and computer program product of the present invention to compare the detailed stress responses, including the fatigue life, of the parts and interconnect structure of the component to pre-selected limits, which may include a target fatigue life for the portions of the component, as represented by the failure assessment block 46. In addition, if the component parts and/or interconnect structure perform outside of the limits, the method, system and computer program product of the present invention may determine the exact causes of the component's unacceptable performance, as described below.

The failure assessment 46 may be performed by any program or process known to those skilled in the art. One example of a failure assessment 46 is to compare the component's stress response to the pre-selected limits to determine a cumulative damage index for each part of the component. The cumulative damage index is a ratio of the number of expected cycles intended in the service or operation of the component and/or overall structure to the number of cycles predicted by the analysis described above for the given temperatures associated with the service or operation cycles. A cumulative damage index is then determined for each part of the component. If the ratio for a certain part of the component is above a threshold, such as 1.0 or above, then the part is likely to fail. The closer the ratio gets to 0.0, the less likely the part will fail. Thus, the component or structural designer may easily determine the part(s) of the component that are likely to fail. FIG. 13 illustrates a plot of the printed wiring assembly of FIG. 2 that indicates the parts of the printed wiring assembly that will fail under the environmental loads to which the printed wiring assembly was subjected during the FEA.

In addition, the failure assessment 46 includes functionality that not only determines the part(s) and/or the portion of the interconnect structure that is likely to fail, if any, but also determines and indicates to the user the reason for the failure. For example, if a printed wiring assembly is the subject of the failure assessment 46, the method, system and computer program product of the present invention will determine the part(s) of the printed wiring assembly that are likely to fail and the reason for the failure, such as the temperatures, shock, acoustics and/or vibration to which the component was subjected. The method, system and computer program product provide reports to the user that explain the failure and reason for the failure of each part and/or the interconnect structure. The reports may provide various levels of detail regarding the reason for failure, from a statement of the environment that caused the failure to a cycle-by-cycle analysis of each environment and the associated damage in order to track the environment that contributed to the most damage.

The method, system and computer program product of the present invention may also prompt the designer to modify the design 48 by prompting modification of the physical layout of the parts of the component or by modification of the user-defined parameters in such a way as to mitigate the effect of the reason for the failure. For instance, if one part of the printed wiring assembly is likely to fail due to the temperatures experienced by the part and/or the interconnect structure that attaches the part to the board, then the designer may move the part to another area of the printed wiring assembly that does not experience temperatures that are as extreme as in the part's previous location. The global and detailed FEA may then be performed again to determine if the modified design mitigated the reason for failure of the part. Additionally, if part(s) of the printed wiring assembly failed due to the solder balls inability to withstand the vibration experienced by the printed wiring assembly, then the designer may modify the user-defined manufacturing parameters 30 to specify a type of solder that is stronger and better able to withstand vibrations. If appropriate, the designer may instead or also move the part to another portion of the board that experiences less vibration. Again, the global and detailed FEA may then be performed again to determine if the modified manufacturing parameter or location mitigated the reason for failure of the part. The process may be repeated until the overall component design comes within the pre-selected limits. Once the designer arrives at an acceptable component design, the FEM of that component design is stored as a representation of the preferred design for the component.

Thus, the method, system and computer program product of the present invention provide an efficient manner in which to arrive at the optimal design for a component. Because much of the process for design analysis of the component occurs via finite element modeling and analysis and because the exact reason(s) for failure of the component or part(s) of the component, including the interconnect structure of the component, are tracked by the finite element analysis, the designer immediately knows which part(s) is/are likely to fail and how to modify the component design to mitigate the failure. In addition, repeated design analyses of the modified component may be performed without adding large amounts of expense and time to the design analysis process. Furthermore, a vibration acoustic link is provided to obtain the component's response to a specific acoustic environment by generating a vibration environment that corresponds to the desired acoustic environment to test the prototype component, which is a much less complex and less expensive process than testing the component in a true acoustic chamber. Thus, the method, system and computer program product of the present invention provides the user with an efficient procedure for redesigning and re-testing the component, based upon the component's stress response to the thermo-structural environments it will be exposed to over its lifetime, that eliminates the time-consuming and costly redesign and re-testing procedures of conventional design analysis.

The system 20 of the present invention and, in particular, the three-dimensional component model 24 the finite element analyses 42, the vibration acoustic link 44, the failure assessment 46, and the design modification 48, are typically embodied by a computer program product that is executed by a processing element and stored by an associated memory device, both of which are commonly comprised by a computer or the like. As such, the system of the present invention generally operates under control of this computer program product to provide the functionality described hereinabove in conjunction with the various components of the system, according to another aspect of the present invention. The computer program product for performing the design analysis of a component includes a computer-readable storage medium, such as the non-volatile storage medium, and computer-readable program code portions, such as a series of computer instructions, embodied in the computer-readable storage medium.

In this regard, FIGS. 1–13 are block diagrams, flowcharts or other schematic representations of methods, systems and program products according to the invention. It will be understood that each block or step of the flowchart, and combinations of blocks in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems that perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. For example, various types of finite element modeling programs, finite element analysis programs (both global and detailed), and environmental loads may be utilized in the method, system and computer program product for design analysis of a component of the present invention. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for design analysis of a component, the method comprising:
   generating a finite element model of the component;
   receiving user-defined parameters defining a plurality of variable associated with the component and including at least one thermo-mechanical environment parameter;
   subjecting the finite element model of the component to at least one environmental load;
   deteimining a stress response of the finite element model based upon the at least one environmental load;
   determining whether the stress response is within pre-selected limits; and
   prompting modification of at least one of a design of the component and at least one user-defined parameter and regenerating the finite element model if the stress response is outside of the pre-selected limits, wherein prompting modification comprises determining a part of the component that is likely to fail and a cause of the part failure and indicating at least one of a design of the component and at least on user-defined parameter to mitigate the cause of the failure.

2. The method of claim 1, wherein determining whether the stress response is within pre-selected limits comprises converting the stress response of the finite element model to a fatigue life for the component and comparing the fatigue life for the component to a target fatigue life for the component.

3. The method of claim 2, wherein prompting modification comprises determining at least one of the design of the component and at least one user-defined parameter that causes the fatigue life for the component to be shorter than the target fatigue life for the component, if the fatigue life for the component is shorter than the target fatigue life for the component.

4. The method of claim 1, futher comprising creating a drawing of a design of the component prior to generating the finite element model of the component.

5. The method of claim 4, wherein creating the drawing of the design of the component comprises creating a three-dimensional computer aided drawing of the design of the component.

6. The method of claim 4, wherein creating the drawing of the design of the component comprises creating a drawing of a design of electronics embedded in the component.

7. The method of claim 1, wherein receiving user-defined parameters defining a plurality of variables associated with the component comprises receiving at least one of at least one manufacturing parameter for the component, at least one boundary condition for the component, and part information for the component.

8. The method of claim 1, wherein receiving am least one thermo-mechanical environment parameter for the component comprises receiving at least one of a thermal environment parameter, an acoustic environment parameter, a vibration environment parameter, and a shock environment parameter.

9. The method of claim 1, further comprising receiving finite element properties and information regarding at least one part of the component.

10. The method of claim 9, wherein receiving information regarding at least one part of the component comprises receiving information from a database of parts information.

11. The method of claim 1, wherein subjecting the finite element model of the component to at least one environmental load comprises subjecting the finite element model of the component to at least one of thermal environmental load, an acoustic environmental load, a vibration environmental load, and a shock environmental load.

12. The method of claim 1, further comprising storing the finite element model as a representation of the design for the component if the stress response is within the pre-selected limits.

13. The method of claim 1, wherein subjecting the finite element model of the component to at least one environmental load comprises:
   subjecting the finite element model of the component to a computational first load;
   subjecting the finite element model of the component to a computational second load;
   determining a maximum response of the finite element model of the component to the first load;
   determining a maximum response of the finite element model of the component to the second load;
   determining a ratio of the maximum responses;
   obtaining a first environmental load to test against the component;
   applying the ratio of the maximum responses to the first environmental load to convert the first environmental load to a second environmental load; and
   subjecting the finite element model to the second environmental load.

14. The method of claim 13, wherein determining a stress response of the finite element model based upon the at least one environmental load comprises determining the stress response of the finite element model based upon the second environmental load.

15. The method of claim 13, wherein obtaining the first environmental load to test against the component comprises obtaining one of an pressure load and an acceleration load, and wherein applying the ratio of the maximum responses to the first environmental load to convert the first environmental load to the second environmental load comprises converting the first environmental load to the other of the acoustic pressure load and the acceleration load.

16. The method of claim 13, wherein subjecting the finite element model of the component to the computational first load comprises subjecting the finite element model of the component to a 1 psi uniform acoustic pressure load.

17. The method of claim 13, wherein subjecting the finite element model of the component to the computational second load comprises subjecting the finite element model of the component to a 1 g negative based acceleration load.

18. The method of claim 13, further comprising applying boundary conditions to the finite element model of the component prior to determining the maximum response of the finite element model of the component to the first load.

19. The method of claim 13, further comprising applying boundary conditions to the finite element model of the component prior to determining the maximum response of the finite element model of the component to the second load.

20. The method of claim 1, wherein subjecting the finite element model of the component to at least one environmental load comprises:
   subjecting the finite element model of the component to a computational acoustic load;
   applying boundary conditions to the finite element model;
   determining a maximum pressure response of the finite element model to the acoustic load and the boundary conditions, wherein the maximum pressure response is based upon a selected sonic pressure load for testing against the component that is converted to a pressure power spectral density;
   subjecting the finite element model to a computational acceleration load;
   applying boundary conditions to the finite element model;
   determining a maximum acceleration response of the finite element model to the acceleration load and the boundary conditions, wherein the maximum acceleration response is based upon a selected sonic pressure load for testing against the component that is converted to a pressure power spectral density;
   determining a ratio of the maximum pressure response to the maximum acceleration response for the selected sonic pressure load;
   applying the ratio of the maximum pressure response to the maximum acceleration response to the pressure power spectral density to convert the pressure power spectral density to an acceleration power spectral density;
   generating an input for a shaker table according to the acceleration power spectral density;
   securing the component to the shaker table;
   applying the input to the shaker table; and
   monitoring the response of the component to the input.

21. The method of claim 20, wherein subjecting the finite element model of the component to the computational acoustic load comprises subjecting the finite element model to a 1 psi uniform pressure load.

22. The method of claim 20, wherein subjecting the finite element model to the computational acceleration load comprises subjecting the finite element model to a 1 g negative base acceleration load.

23. An automated system for design analysis of a component, the system comprising:
   a client element capable of receiving user-defined parameters defining a plurality of variables associated with the component and including at least one thermo-mechanical environment parameter, and said client element also capable of receiving at least one of a modified design of the component and at least one modified user-defined parameter; and
   a processing element responsive to said client element and capable of generating a finite element model of the component, said processing element also capable of automatically performing the design analysis based upon user-defined parameters defining a plurality of variables associated with the component and including at least one thormo-mechanical environment parameter without additional manual input by subjecting the finite element model of the component to at least one environmental load, determining a stress response of the finite element model based upon the at least one environmental load, and determining whether the stress response is within pre-selected limits, said processing element further capable of prompting modification of at least one of the design of the component and at least one user-defined parameter by determining a part of the component that is likely to fail and a cause of the part failure and indicating at least one of a design of the component and at least one user-defined parameter to mitigate the cause of the failure, and said processing element also capable of automatically regenerating the finite element model and automatically re-performing the design analysis based upon the at least one of the modified design of the component and at least one modified user-defined parameter without additional manual input if the stress response is outside of the pre-selected limits.

24. The system of claim 23, further comprising a storage element for storing the finite element model as a representation of the design for the component if the stress response is within the pre-selected limits.

25. The system of claim 23, wherein said processing element determines whether the stress response is within pre-selected limits by converting the stress response of the finite element model to a fatigue life for the component and comparing the fatigue life for the component to a target fatigue life for the component.

26. The system of claim 25, wherein said processing element is further capable of determining at least one of the design of the component and at least one user-defined parameter that causes the fatigue life for the component to be shorter than the target fatigue life for the component, if the fatigue life for the component is shorter than the target fatigue life for the component.

27. The system of claim 23, wherein said client element receives user-defined parameters by receiving at least one manufacturing parameter for the component, at least one boundary condition for the component, and part information for the component.

28. The system of claim 23, wherein said client element receives at least one thermo-mechanical environment parameter for the component by receiving at least one of a thermal environment parameter, an acoustic environment parameter, a vibration environment parameter, and a shock environment parameter.

29. The system of claim 23, wherein said client element is further capable of receiving finite element properties and information regarding at least one part of the component.

30. The system of claim 29, wherein said client element receives information regarding at least one part of the component from a database of parts information.

31. The system of claim 23, wherein said processing element subjects the finite element model of the component to at least one environmental load by subjecting the finite element model of the component to at least one of a thermal environmental load, an acoustic environmental load, a vibration environmental load, and a shock environmental load.

32. The system of claim 23, wherein said client element is further capable of receiving a drawing of a design of the component.

33. The system of claim 32, wherein said client element receives the drawing of the design of the component by receiving a three-dimensional computer aided drawing of the design of the component.

34. The system of claim 32, wherein said client element receives the drawing of the design of the component by receiving a drawing of a design of electronics embedded in the component.

35. The system of claim 23, wherein said processing element subjects the finite element model of the component to at least one environment by:
 subjecting the finite element model of the component to a computational first load;
 subjecting the finite element model of the component to a computational second load;
 determining a maximum response of the finite element model of the component to the first load;
 determining a maximum response of the finite element model of the component to the second load;
 determining a ratio of the maximum responses;
 obtaining a first environmental load to test against the component;
 applying the ratio of the maximum responses to the first environmental load to convert the first environmental load to a second environmental load; and
 subjecting the finite element model to the second environmental load.

36. The system of claim 35, wherein said processing element determines the stress response of the finite element model based upon the at least one environmental load by determining the stress response of the finite element model based upon the second environmental load.

37. The system of claim 35, wherein said processing element obtains the first environmental load to test against the component by obtaining one of an acoustic pressure load and an acceleration load, and wherein said processing element applies the ratio of the maximum responses to the first environmental load to convert the first environmental load to the second environmental load that is the other of the acoustic pressure load and the acceleration load.

38. The system of claim 35, wherein said processing element subjects the finite element model of the component to a computational first load by subjecting the finite element model of the component to a 1 psi uniform acoustic pressure load.

39. The system of claim 35, wherein said processing element subjects the finite element model of the component to a computational second load by subjecting the finite model of the component to a 1 g negative based acceleration load.

40. The system of claim 35, wherein said processing element is further capable of applying boundary conditions to the finite element model of the component prior to determining the maximum response of the finite element model of the component to the first load.

41. System of claim 35, wherein said processing element is further capable of applying boundary conditions to the finite element model of the component prior to determining the maximum response of the finite element model of the component to the second load.

42. The system of claim 23, wherein said processing element subjects the finite element model of the component to at least one environment by:
 subjecting the finite element model of the component to a computational acoustic load;
 applying boundary conditions to the finite element model;
 determining a maximum pressure response of the finite element model to the acoustic load and the boundary conditions, wherein the maximum pressure response is based upon a selected sonic pressure load for testing against the component that is converted to a pressure power spectral density;
 subjecting the finite element model to a computational acceleration load;
 applying boundary conditions to the finite element model;
 determining a maximum acceleration response of the finite element model to the acceleration load and the boundary conditions, wherein the maximum acceleration response is based upon a selected sonic pressure load for testing against the component that is converted to a pressure power spectral density;
 determining a ratio of the maximum pressure response to the maximum acceleration response for the selected sonic pressure load;

applying the ratio of the maximum pressure response to the maximum acceleration response to the pressure power spectral density to convert the pressure power spectral density to an acceleration power spectral density;

generating an input for a shaker table according to the acceleration power spectral density;

applying the input to the shaker table upon which the component is secured; and monitoring the response of the component to the input.

43. The system of claim 42, wherein said processing element subjects the finite element model of the component to the computational acoustic load by subjecting eating the finite element model of the component to a 1 psi uniform pressure load.

44. The system of claim 42, wherein said processing element subjects the finite element model of the component to the computational acceleration load by subjecting the finite element model of the component to a 1 g negative base acceleration load.

45. A computer program product for automated design analysis of a component, the computer program product comprising a computer-readable storage medium having computer-readable program code portions stored therein, the computer-readable program code portions comprising:

a first executable portion capable of receiving user-defined parameters associated with the component and including at least one thermo-mechanical environment parameter;

a second executable portion capable of generating a finite element model of the component;

a third executable portion capable of automatically performing design analysis based upon the user-defined parameters associated with the component and including at least one thermo-mechanical environment parameter, the finite element properties, and the information regarding at least one part of the component without further manual input by subjecting the finite element model of the component to at least one environmental load, determining a stress response of the finite element model based upon the at least one environmental load, and determining whether the stress response is within pre-selected limits; and a fourth executable portion capable of prompting modification of at least one of the design of the component and at least one user-defined parameter by determining a part of the component that is likely to fail and a cause of the part failure and indicating at least one of a design of the component and at least one user-defined parameter to mitigate the cause of the failure, said fourth executable portion also capable of regenerating the finite element model if the stress response is outside of the pre-selected limits.

46. The computer program product of claim 45, wherein said third executable portion determines whether the stress response is within pre-selected limits by converting the stress response of the finite element model to a fatigue life for the component and comparing the fatigue life for the component to a target fatigue life for the component.

47. The computer program product of claim 46, wherein said third executable portion is further capable of determining at least one of the design of the component and at least one user-defined parameter that causes the fatigue life for the component to be shorter than the target fatigue life for the component, if the fatigue life for the component is shorter than the target fatigue life for the component.

48. The computer program product of claim 45, wherein said first executable portion receives user-defined parameters by receiving at least one manufacturing parameter for the component, at least one boundary condition for the component, and part information for the component.

49. The computer program product of claim 45, wherein said first executable portion receives at least one thermo-mechanical environment parameter for the component by receiving at least one of a thermal environment parameter, an acoustic environment parameter, a vibration environment parameter, and a shock environment parameter.

50. The computer program product of claim 45, wherein said first executable portion is also capable of receiving finite element properties and information regarding at least one part of the component.

51. The computer program product of claim 50, wherein said first executable portion receives information regarding at least one part of the component from a database of parts information.

52. The computer program product of claim 45, wherein said third executable portion subjects the finite element model of the component to at least one environmental load by subjecting the finite element model of the component to at least one of a thermal environmental load, an acoustic environmental load, a vibration environmental load, and a shock environmental load.

53. The computer program product of claim 45, wherein said first executable portion is further capable of receiving a drawing of a design of the component.

54. The computer program product of claim 53, wherein said first executable portion receives the drawing of the design of the component by receiving a three-dimensional computer aided drawing of the design of the component.

55. The computer program product of claim 53, wherein said first executable portion receives the drawing of the design of the component by receiving a drawing of a design of electronic embedded in the component.

56. The computer program product of claim 45, further comprising a fifth executable portion for storing the finite element model as a representation of the design for the component if the stress response is within the pre-selected limits.

57. The computer program product of claim 45, wherein said third executable portion subjects the finite element model of the component to at least one environment by:

subjecting the finite element model of the component to a computational first load;

subjecting the finite element model of the component to a computational second load;

determining a maximum response of the finite element model of the component to the first load;

determining a maximum response of tho finite element model of the component to the second load;

determining a ratio of the maximum responses;

obtaining a first environmental load to test against the component;

applying the ratio of the maximum responses to the first environmental load, to convert the first environmental load to a second environmental load; and subjecting the finite element model to the second environmental load.

58. The computer program product of claim 57, wherein said third executable portion determines the stress response of the finite element model based upon the at least one environmental load by determining a stress response of the finite element model based upon the second environmental load.

59. The computer program product of claim 57, wherein said third executable portion obtains the first environmental load to test against the component by obtaining one of an acoustic pressure load and an acceleration load, and wherein said third executable portion applies the ratio of the maximum responses to the first environmental load to convert the first environmental load to the second environmental load that is the other of the acoustic pressure load and the acceleration load.

60. The computer program product of claim 57, wherein said third executable portion subjects the finite element model of the component to the computational first load by subjecting the finite element model of the component to a 1 psi uniform acoustic pressure load.

61. The computer program product of claim 57, wherein said third executable portion subjects the finite element model of the component to the computational second load by subjecting the finite element model of the component to a 1 g negative based acceleration load.

62. The computer program product of claim 57, wherein said third executable portion is further capable of applying boundary conditions to the finite element model of the component prior to determining the maximum response of the finite element model of the component to the first load.

63. The computer program product of claim 57, wherein said third executable portion is further capable of applying boundary conditions to the finite element model of the component prior to determining the maximum response of the finite element model of the component to the second load.

64. The computer program product of claim 45, wherein said third executable portion subjects the finite element model of the component to at least one environment by:

subjecting the finite element model of the component to a computational acoustic load;

applying boundary conditions to the finite element model;

determining a maximum pressure response of the finite element model to the acoustic load and the boundary conditions, wherein the maximum pressure response is based upon a selected sonic pressure load for testing against the component that is converted to a pressure power spectral density;

subjecting the finite element model to a computational acceleration load;

applying boundary conditions to the finite element model;

determining a maximum acceleration response of the finite element model to the acceleration load and the boundary conditions, wherein the maximum acceleration response is based upon a selected sonic pressure load for testing against the component that is converted to a pressure power spectral density;

determining a ratio of the maximum pressure response to the maximum acceleration response for the selected sonic pressure load;

applying the ratio of the maximum pressure response to the maximum acceleration response to the pressure power spectral density to convert the pressure power spectral density to an acceleration power spectral density;

generating an input for a shaker table according to the acceleration power spectral density;

applying the input to the shaker table upon which the component is secured; and monitoring the response of the component to the input.

65. The computer program product of claim 64, wherein said third executable portion subjects the finite element model of the component to the computational acoustic load by subjecting the finite element model of the component to a 1 psi uniform pressure load.

66. The computer program product of claim 64, wherein said third executable portion subjects the finite element model of the component to the computational acceleration load by subjecting the finite element model of the component to a 1 g negative base acceleration load.

* * * * *

UNITED STATES PATENT AND TRADEMARK OFFICE
CERTIFICATE OF CORRECTION

| | |
|---|---|
| PATENT NO. | : 6,813,749 B2 |
| DATED | : November 2, 2004 |
| INVENTOR(S) | : Rassaian |

It is certified that error appears in the above-identified patent and that said Letters Patent is hereby corrected as shown below:

Column 20,
Line 23, "on" should read -- one --.

Signed and Sealed this

Twenty-ninth Day of March, 2005

JON W. DUDAS
*Director of the United States Patent and Trademark Office*